L. PINE.
Process of Treating Wood for Bending
No. 148,752.    Patented March 17, 1874.
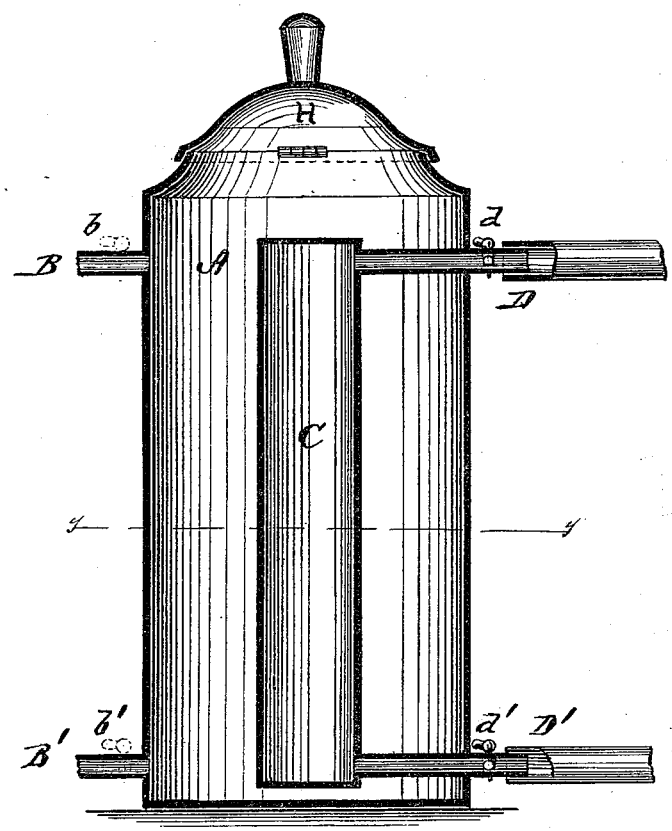
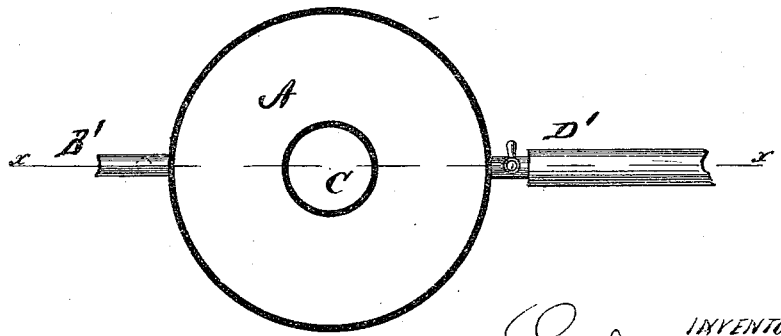

UNITED STATES PATENT OFFICE.

LEIGHTON PINE, OF SOUTH BEND, INDIANA.

IMPROVEMENT IN PROCESSES OF TREATING WOOD FOR BENDING.

Specification forming part of Letters Patent No. 148,752, dated March 17, 1874; application filed January 31, 1874.

*To all whom it may concern:*

Be it known that I, LEIGHTON PINE, of South Bend, in the county of St. Joseph and State of Indiana, have invented certain new and useful Improvements in Process for Preparing Lumber for Bending; and I do hereby declare that the following is a full, clear, and exact description thereof, reference being had to the accompanying drawings, and to the letters of reference marked thereon, which form part of this specification.

The nature of my invention consists in treating lumber to the action of hot water under pressure, which action, when continued for a length of time sufficient to heat the lumber throughout to the same temperature as the water—not less than 200°—thoroughly seasons the lumber, and makes it, while hot, very soft and pliable, thus accomplishing the twofold results, viz., seasoning and preparing the lumber for bending.

Lumber, when treated by this process, may be bent without the use of many of the complicated devices now in use to prevent the wood splitting while being bent, as it is made very pliable when the water-pressure is sufficient, the temperature kept to about 200°, and the action continued sufficiently long to thoroughly heat the whole mass to be bent.

In order to enable others skilled in the art to which my invention appertains to make and use the same, I will now proceed to describe one of the many apparatus by which my process may be carried out.

In the accompanying drawing, Figure 1 is a longitudinal section, and Fig. 2 a horizontal section, of my apparatus.

A represents a tank of suitable dimensions, provided with a lid or cover, H, and near the top with a water-supply pipe, B, having stop-cock $b$, and near the bottom with an outlet-pipe, B', having stop-cock $b'$, for convenience in drawing off the water when desired. The supply-pipe B is connected with an elevated tank, or with the water-pipes in the places where used where there is a great pressure of water, so that the water in the tank A is under pressure when the tank is full. C represents a steam-drum within the tank A, having an inlet-pipe, D, provided with a stop-cock, $d$, at the top, and at the bottom provided with an outlet-pipe, D', and stop-cock $d'$. The pipes D and D' are connected with a boiler, steam entering through the pipe D, and, when condensed, falls to the bottom of the drum C, and returns to the boiler through the pipe D', the flow of steam to and water from the drum C being regulated by the stop cocks $d$ and $d'$.

The lumber is placed in the tank A, and the lid or cover H, which is water-tight, closed. The stop-cock $b'$ is then closed and the stop-cock $b$ opened, and the chamber or tank A filled, the water being allowed to run in as long as it will, thus making a pressure of water in the tank A. Steam is then admitted to the drum C, thus heating the water under pressure in the tank to the degree required.

The object of placing the drum C within the tank is that the entire surface comes in contact with the water in the tank, which would not be the case were the devices reversed.

The length of time required to complete the treatment is governed by the thickness of the lumber and the water-pressure used in the tank.

Walnut boards one inch thick will be thoroughly seasoned in ten minutes with the water kept at 200° heat and with seventy pounds water-pressure in the tank.

Should the lumber be required for bending, it is advisable to allow it to remain a few minutes longer under treatment, which makes it more pliable, when it may be bent easily without danger of splitting, and without the use of safeguards, which are indispensable when the lumber is treated by the ordinary processes now in use.

I am aware that steam has been used under pressure to season lumber; but I consider my hot-water-pressure process superior to that, as the lumber may be left under hot-water pressure for hours after it is seasoned without injuring its strength, while with steam-pressure great care must be used to remove the lumber as soon as the steam has penetrated its center, or it will be ruined. Only a certain amount of steam-pressure can be used with safety, while with hot water there is no limit to the safe pressure. The more pressure, the quicker the lumber will be made pliable.

Having thus described my invention, what I claim as new, and desire to secure by Letters Patent, is—

The process of preparing wood for bending by placing the wood under a water-pressure, the water, after being given the required pressure, heated by suitable means, as and for the purpose herein set forth.

In testimony that I claim the foregoing as my own I affix my signature in presence of two witnesses.

LEIGHTON PINE.

Witnesses:
ED. P. CHAPIN,
WILLIS A. BUGBEE.